United States Patent
Cannici et al.

(10) Patent No.: US 9,376,183 B2
(45) Date of Patent: Jun. 28, 2016

(54) DOG FLOTATION DEVICES AND LIFE VESTS HAVING SAFETY FLAGS

(71) Applicants: Glen Cannici, Elmwood Park, NJ (US); Nicole Cannici, Lodi, NJ (US)

(72) Inventors: Glen Cannici, Elmwood Park, NJ (US); Nicole Cannici, Lodi, NJ (US)

(*) Notice: Subject to any disclaimer, the term of this patent is extended or adjusted under 35 U.S.C. 154(b) by 0 days.

(21) Appl. No.: 13/960,919

(22) Filed: Aug. 7, 2013

(65) Prior Publication Data

US 2014/0045395 A1    Feb. 13, 2014

Related U.S. Application Data

(60) Provisional application No. 61/680,422, filed on Aug. 7, 2012.

(51) Int. Cl.
| | | |
|---|---|---|
| *B63B 45/00* | (2006.01) | |
| *B63C 9/115* | (2006.01) | |
| *B63C 9/20* | (2006.01) | |
| B63C 9/08 | (2006.01) | |
| A01K 13/00 | (2006.01) | |

(52) U.S. Cl.
CPC . *B63C 9/21* (2013.01); *B63C 9/115* (2013.01); *B63C 9/20* (2013.01); *A01K 13/006* (2013.01); *B63C 2009/084* (2013.01)

(58) Field of Classification Search
CPC .... B63C 9/20; B63C 2009/084; B63C 9/115; B63C 9/11; A01K 13/006
USPC ............. 441/89; 119/850, 858, 859, 856
See application file for complete search history.

(56) References Cited

U.S. PATENT DOCUMENTS

| | | | | |
|---|---|---|---|---|
| 4,035,856 A | * | 7/1977 | Oberg | 441/89 |
| 4,475,476 A | * | 10/1984 | Howard | 116/210 |
| 5,199,383 A | * | 4/1993 | Lagana | 119/858 |
| 5,523,927 A | * | 6/1996 | Gokey | 362/103 |
| 5,632,235 A | * | 5/1997 | Larsen et al. | 119/856 |
| 6,659,824 B1 | | 12/2003 | McCormick | |
| 7,121,231 B2 | * | 10/2006 | Benefiel | 119/850 |
| 7,160,167 B2 | | 1/2007 | Peters | |
| 7,559,817 B2 | | 7/2009 | Von Zell | |
| 8,182,300 B2 | | 5/2012 | Cosson | |
| 2010/0240272 A1 | * | 9/2010 | Cosson | 441/106 |
| 2012/0164898 A1 | * | 6/2012 | McKinney | 441/89 |

* cited by examiner

*Primary Examiner* — Andrew Polay
(74) *Attorney, Agent, or Firm* — Doherty IP Law Group LLC

(57) ABSTRACT

A dog flotation device with safety flag includes a flotation vest having a central panel adapted to cover the back of a dog, and a safety flag including a flag staff having a lower end connected with the flotation vest and an upper end remote from the lower end. The safety flag includes a motion-activated light connected to the upper end of the flag staff and a flag attached to the flag staff below the motion-activated light. One or more buoyant elements are incorporated into the flotation vest for providing buoyancy to the dog flotation device. The motion-activated light includes an LED light, a power source, a motion detector for detecting movement of the motion-activated light, and a circuit for activating said LED light in response to the detection of motion by the motion detector.

20 Claims, 8 Drawing Sheets

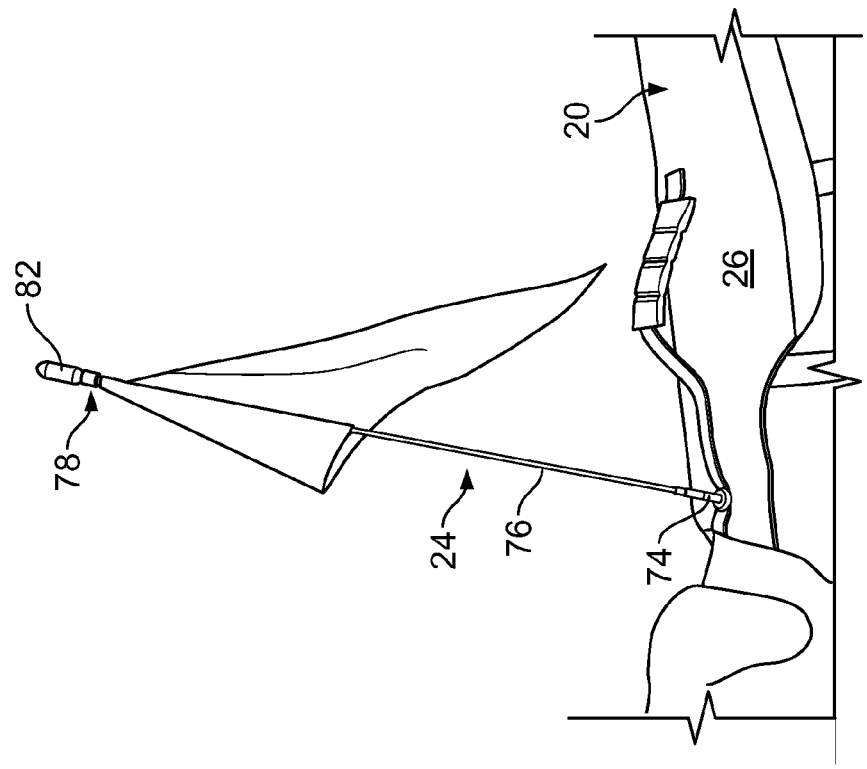
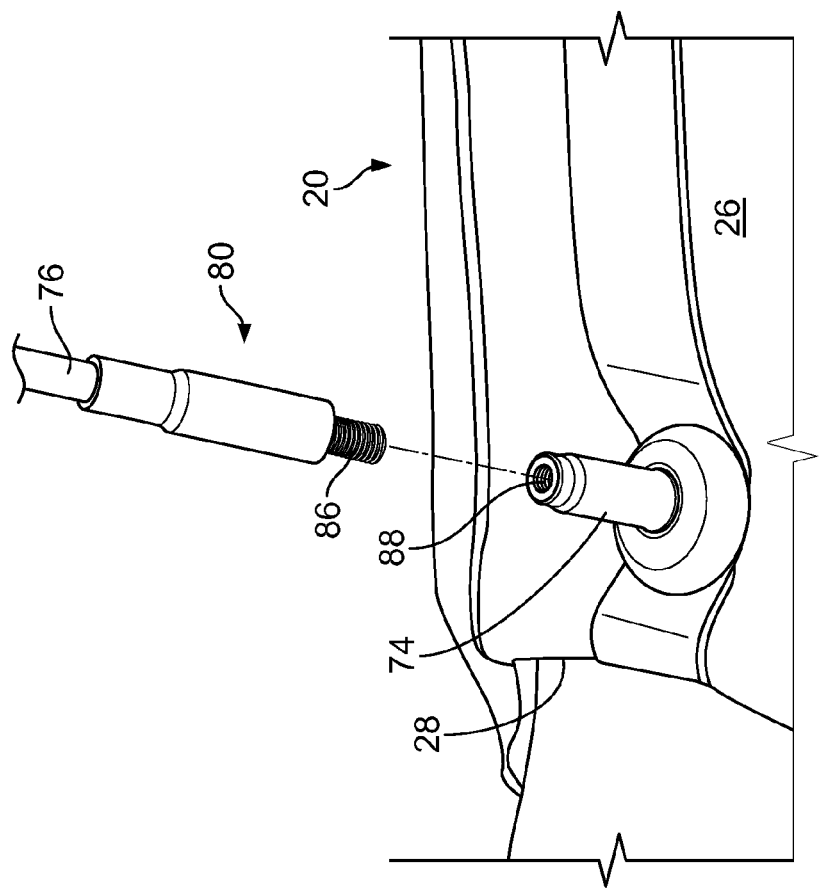

DOG FLOTATION DEVICES AND LIFE VESTS HAVING SAFETY FLAGS

CROSS REFERENCE TO RELATED APPLICATIONS

The present application claims benefit of U.S. Provisional Application Ser. No. 61/680,422, filed Aug. 7, 2012, the disclosure of which is hereby incorporated by reference herein.

BACKGROUND OF THE INVENTION

1. Field of the Invention

The present application is generally related to flotation devices and life vests, and is more specifically related to flotation devices and flotation vests for dogs.

2. Description of the Related Art

A wide variety of dog floatation devices have been developed for supporting dogs in a water environment. The existing devices include wrap-around vests with buoyant elements such as closed-cell foam that buckles around the dog.

For example, U.S. Pat. No. 5,632,235 to Larsen et al. discloses a pet floatation aid and walker that includes a hollow and rectangular-shaped top panel that contains a piece of internal foam floatation material, hollow and trapezoidal-shaped right and left side panels that contain pieces of internal foam floatation material and are generally downwardly bendable from the hollow and rectangular-shaped top panel, trapezoidal-shaped and wide right and left belly flaps that are generally inwardly bendable from the hollow and trapezoidal-shaped right and left side panels, generally concavo-convex-shaped right and left neck flaps that contain pieces of internal foam floatation material and are generally inwardly bendable from the hollow and trapezoidal-shaped right and left side panels, neck flap attaching apparatus for releasably attaching the generally concavo-convex-shaped right and left neck flaps to each other, a first continuous, light-reflective, and adjustable belly strap, first strap attaching apparatus for releasably attaching the fixed proximal end and the free distal end of the first continuous, light-reflective, and adjustable belly strap to each other, a second continuous, light-reflective, and adjustable belly strap, and second strap attaching apparatus for releasably attaching the fixed proximal end and the free distal end of the second continuous, light-reflective, and adjustable belly strap to each other.

U.S. Pat. No. 6,659,824 to McCormick discloses a life preserver for use by a four-legged animal for supporting the animal in a generally horizontal, partially submerged state of floating equilibrium in a body of water. The life preserver includes an inflation chamber, and a harness system connected to the inflation chamber for attaching the life preserver to an animal. When worn inflated, the life preserver maintains an animal at or near the surface of the water, with the animal's head out of the water. The harness system has at least one adjustable harness for encircling the chest and waist areas of an animal. The inflation system includes at least one of a manual inflation system, an automatic inflation system and an oral inflation tube. When deflated, the inflation chamber is adapted to be folded over and packed within a shroud. In one embodiment, the inflation system may have an automatic $CO_2$ inflation system or a manually activated $CO_2$ inflation system.

For example, U.S. Pat. No. 7,160,167 to Peters discloses an animal safety apparatus having a strap-like carrier and one or more non-inflatable floatation members secured adjacent the carrier by a cover material stitched to the carrier.

U.S. Pat. No. 7,559,817 to Von Zell teaches a dog "swim safe" floatation system including flanking water wings sewn directly to a suspension-type harness for the dog. The harness can be adjusted by a system of Velcro and latches and thus the entire apparatus can be conveniently modified to promote stability. A canine floatation collar is also disclosed.

U.S. Pat. No. 8,182,300 to Cosson discloses a canine flotation apparatus that uses a segmented panel construction and varying densities of foam within the panels of the apparatus to comfortably and evenly float canines of a wide variety of weights and dimensions. The chest yoke panel and belly panel cradles the canine in the apparatus, helping to keep the head above water. The chest yoke panel further provides a measure of insulation around the heart and lungs, which permits easier lifting of the canine due to the more secure fit and facilitates more natural movement by the canine in the water.

In spite of the above advances, there remains a need for improved dog flotation devices that are easier to secure to dogs and that are more visible to third parties when the dogs are in water. There also remains a need for dog flotation devices that enable owners to easily locate their dogs when the dogs are in the water and that facilitate placing dogs into and retrieving dogs from the water.

SUMMARY OF THE INVENTION

In one embodiment, a dog flotation device with safety flag preferably includes a flotation vest having a central panel adapted to cover the back of a dog. In one embodiment, the flotation vest is preferably made of materials such as vinyl, nylon, plastic, and/or cotton. In one embodiment, the dog flotation device desirably includes a safety flag with a flag staff having a lower end connected with the flotation vest and an upper end remote from the lower end. The flag staff desirably includes a flexible rod, such as a fiberglass rod, having a diameter of about 1/16"-1/8" and a length of about 18-30".

In one embodiment, the safety flag desirably has a motion-activated light connected to the upper end of the flag staff and a flag attached to the flag staff below the motion-activated light. The dog flotation device preferably includes one or more buoyant elements, such as closed-cell foam elements, incorporated into the flotation vest for providing buoyancy to the dog flotation device.

In one embodiment, the motion-activated light includes an LED light, a power source, and a motion detector for detecting movement of the motion-activated light. The motion-activated light may also have a circuit for activating the LED light in response to the detection of motion by the motion detector. In one embodiment, the LED light blinks on and off when motion is detected by the motion detector.

In one embodiment, the central panel of the flotation vest desirably includes a leading edge adapted to conform to the neck of a dog, a trailing edge remote from the leading edge, and first and second edges that extend between the leading and trailing edges of the central panel.

In one embodiment, the dog flotation device may include a first neck wrap extending forward of the leading edge and the first side edge of the central panel, and a second neck wrap extending forward of the leading edge and the second side edge of the central panel. In one embodiment, the first and second neck wraps desirably fold over one another for encircling the neck of the dog.

In one embodiment, the dog flotation device may include fasteners, such as hook and loop fasteners or straps and buckles, for holding the first and second neck wraps together and around the neck of the dog.

In one embodiment, the dog flotation device preferably includes a first side flap attached to and extending laterally away from the first side edge of the central panel, and a second side flap attached to and extending laterally away from the second side edge of the central panel. The first and second side flaps are desirably wrapped around the chest and the belly of the dog for securing the flotation vest to the dog. In one embodiment, hook and loop fasteners are used for securing the first and second side flaps together. In one embodiment, the flotation device may include length-adjustable straps for securing the flotation vest to the dog. In one embodiment, the length-adjustable straps have free ends with buckles.

In one embodiment, the dog flotation device preferably has a flag staff mounting base secured to the central panel of the flotation vest. The flag staff mounting base may have an internally threaded female opening accessible at a top side of the central panel, and the lower end of the flag staff may have an externally threaded shaft that screws into the internally threaded female opening of the flag staff mounting base for securing the safety flag to the central panel of the flotation vest.

In one embodiment, the dog flotation device preferably includes at least one piece of light reflective material attached to the central panel. In one embodiment, light reflective patches are attached to the top side of the dog flotation device for reflecting light shined in the dog flotation device.

In one embodiment, the dog flotation device preferably has a grab handle secured to the central panel. The grab handle desirably extends between a leading edge and a trailing edge of the central panel. In one embodiment, the dog flotation device desirably includes a leash ring secured to the central panel, which is located adjacent the leading edge of the central panel.

In one embodiment, a dog flotation device with safety flag preferably includes a flotation vest having one or more buoyant elements, the flotation vest having a central panel including a leading edge, a trailing edge, and first and second side edges that extend between the leading and trailing edges. The device desirably has a first neck wrap extending forward from the central panel between the leading edge and the first side edge of the central panel, and a second neck wrap extending forward from the central panel between the leading edge and the second side edge of the central panel, whereby the first and second neck wraps oppose one another and are adapted to wrap around the neck of a dog for holding the leading edge of the central panel against the back of the neck of the dog. The device preferably includes a first laterally extending side flap attached to and extending away from the first side edge of the central panel, and a second laterally extending side flap attached to and extending away from the second side edge of the central panel, whereby the first and second side flaps are adapted to wrap around the chest and the belly of the dog for securing the flotation vest around the mid-section of the dog. The device preferably has a safety flag including a flag staff having a lower end connected with the flotation vest and an upper end remote from the lower end. In one embodiment, the safety flag desirably has a motion-activated LED light connected to the upper end of the flag staff and a reflective flag attached to the flag staff below the motion-activated light. The LED light is preferably adapted to blink on and off when motion of the flag staff is detected.

In one embodiment, the flag staff is flexible for moving between a vertical orientation and a horizontal orientation in response to external forces exerted upon the flag staff. The flotation device desirably includes hook and loop fasteners provided on the side flaps and neck wraps, and length-adjustable straps adapted to wrap around the dog for securing the flotation vest to the dog.

In one embodiment, the flotation vest may have one or more inflatable bladders that may be inflated with air. In one embodiment, the flotation vest may have one or more bladders in communication with a gas producing element, such as a $CO_2$ gas producing element that automatically inflates the bladders when the flotation vest is placed into water.

In one embodiment, the light at the upper end of the flag staff automatically switches on when the flotation vest contacts water. In one embodiment, the flotation vest may include a moisture or water detector that automatically inflates one or more bladders and/or activates the light when moisture or water is detected. In one embodiment, the safety flag and/or the light emits an audible sound (e.g., a beep) when the flotation vest contacts water, which provides another mechanism for an owner and third parties to locate and identify a dog wearing the flotation vest.

In one embodiment, the vest with the safety flag may be worn by hunting dogs when accompanying hunters. The vest may also be worn by dogs accompanying hikers, runners, and joggers so that third parties, including the drivers of vehicles and bikes, can be alerted that a dog is in the area. In one or more of these no-water sport environments, the vest may not have a buoyant element incorporated therein.

These and other preferred embodiments of the present invention will be described in more detail below.

BRIEF DESCRIPTION OF THE DRAWINGS

FIG. 3A shows a lower end of a safety flag juxtaposed with a safety flag mounting base provided on a dog flotation vest, in accordance with one embodiment of the present invention.

FIG. 3B shows the safety flag of FIGS. 2 and 3A secured to the safety flag mounting base of FIG. 3A, in accordance with one embodiment of the present invention.

DETAILED DESCRIPTION OF PREFERRED EMBODIMENTS

Figure 1:
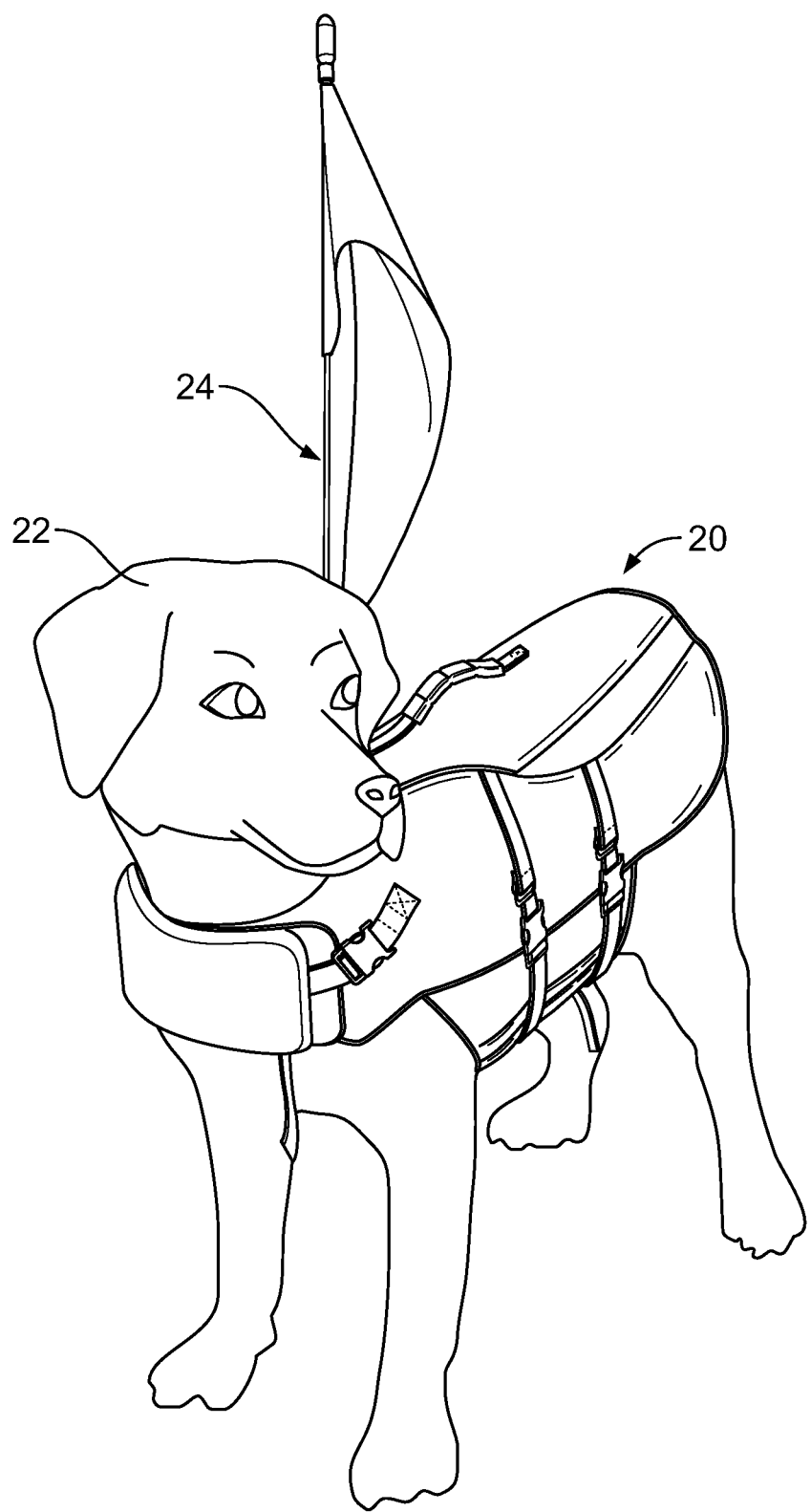
FIG. 1 shows a perspective view of a dog flotation vest having a safety flag with a motion-activated light, in accordance with one embodiment of the present invention.

Referring to FIG. 1, in one embodiment, a dog flotation vest 20 is adapted to be worn by a dog 22 for keeping the dog safe when in water, such as a dog swimming in a river, a lake, or the ocean. The dog flotation vest 20 is preferably made of flexible materials such as vinyl, nylon, synthetics, cotton, and/or plastic. The dog flotation vest preferably contains buoyant material, such as closed-cell foam pads, for providing buoyancy to the flotation vest. The dog flotation vest 20 desirably includes a safety flag 24 that is attached to the flotation vest 20 and that normally has an upright configuration (e.g., vertical) to alert third parties that a dog is present in the water. For example, the safety flag may alert third parties, such as boaters and Jet Ski operators, that a dog is swimming in the area. In one embodiment, the safety flag may help an owner determine where his or her dog is located in the water.

Figure 2:
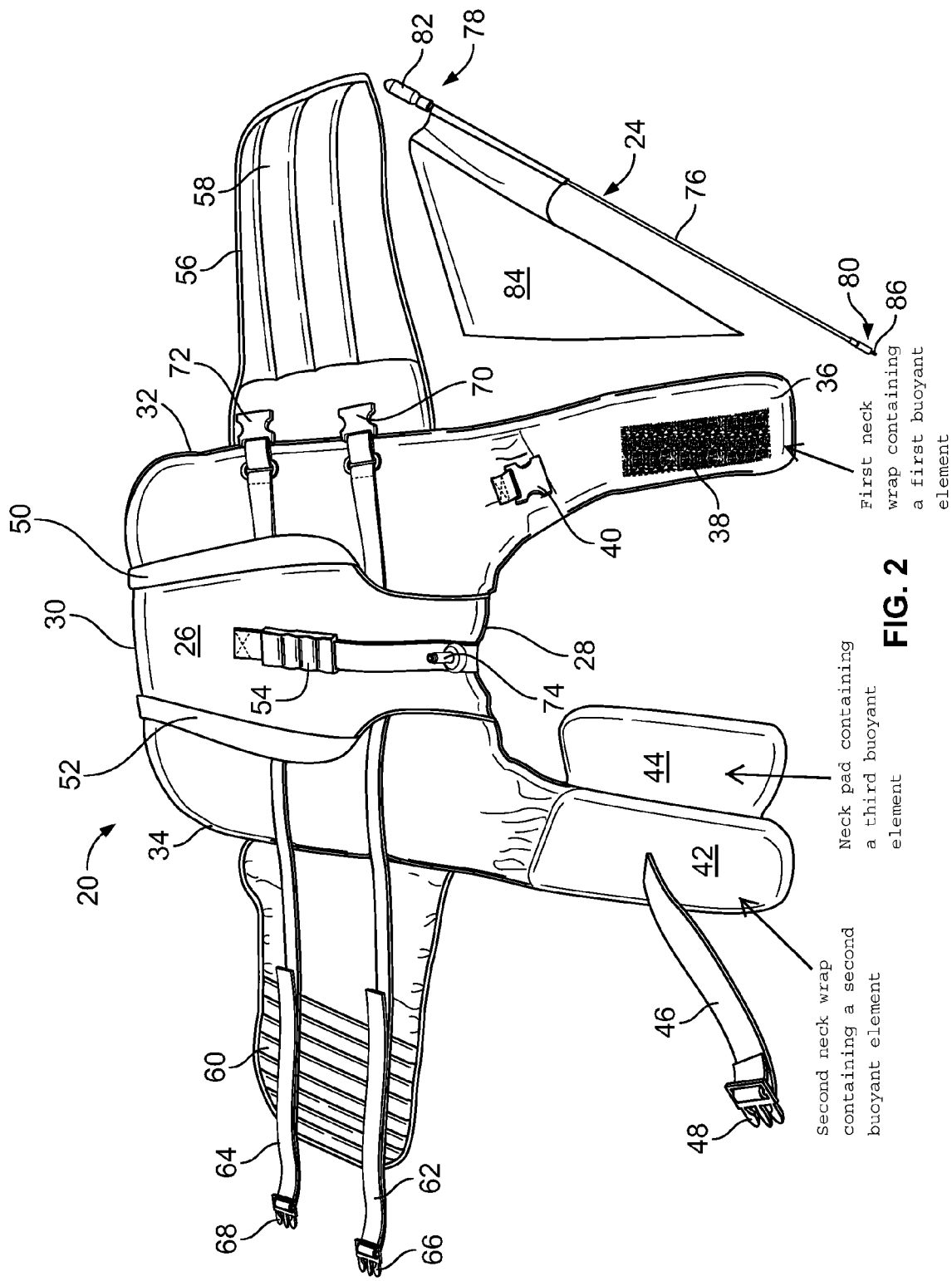
FIG. 2 shows a top plan view of the dog flotation vest and the safety flag shown in FIG. 1.

Referring to FIG. 2, in one embodiment, the dog flotation vest 20 preferably includes a central panel 26, such as a panel made of nylon material, having a leading edge 28, a trailing edge 30, a first lateral edge 32, and a second lateral edge 34. One or more buoyant elements, such as closed-cell foam pads, may be disposed within the central panel to provide buoyancy to the dog flotation vest. The leading edge 28 of the central panel 26 may be contoured (e.g., have a concave shape) to conform to the shape of a dog's neck.

In one embodiment, the flotation vest preferably includes a first neck wrap section 36 that extends forward of the front edge 28 and the first lateral side edge 32 of the central panel 26. The first neck wrap 36 preferably includes a hook and loop fastener patch 38 and a buckle clasp 40 attached thereto. The first neck wrap section 36 may have a buoyant element disposed therein.

In one embodiment, the flotation vest 20 preferably includes a second neck wrap section 42 that opposes the first neck wrap section 36. The second neck wrap section preferably extends forward of the leading edge 28 and the second lateral edge 34 of the center panel 26 of the flotation vest. The second neck wrap section 42 desirably includes a flotation pad 44 that contains a buoyant material, such as a closed-cell foam pad, an adjustable-length securing strap 46, and a buckle 48 that is insertable into the buckle clasp 40 attached to the first neck wrap section 36. The second neck wrap section 42 may also have a buoyant element disposed therein.

In one embodiment, the center panel 26 of the flotation vest 20 preferably includes reflective material strips 50, 52, which are desirably secured to the top side of the central panel 26 for reflecting light at the top side of the flotation vest.

In one embodiment, the flotation vest 20 desirably includes a grab handle 54 that is secured to the top side of the central panel 26. The grab handle 54 may be utilized for placing a dog into the water and/or retrieving a dog from the water.

In one embodiment, the flotation vest 20 preferably includes a first laterally extending side panel 56 that extends from the first lateral side edge 32 of the central panel 26. The first side panel 56 preferably includes strips or pads of hook and loop fasteners 58 (e.g., VELCRO). The flotation vest 20 also desirably includes a second laterally extending side panel 60 that extends from the second lateral side edge 34 of the central panel 26. The second laterally extending side panel 60 desirably includes strips or pads of hook and loop fasteners (not shown) that oppose the hook and loop fastener strips 58 provided on the first lateral panel 56. In one embodiment, the first and second laterally extending side panels are wrapped around the belly and chest of a dog and held together using the hook and loop fastening material.

The flotation vest 20 also desirably includes laterally extending length-adjustable straps 62, 64 that are secured to the central panel 26 and that extend away from the second lateral edge 34 of the central panel 26. The free ends of the lateral length-adjustable straps 62, 64 have buckles 66, 68, respectively, that are insertable into lateral buckle clasps 70, 72 secured to the opposite edge of the central panel 26, located adjacent the first lateral edge 32 of the central panel 26.

In one embodiment, a safety flag 24 is securable to a safety flag mounting base 74 attached to the central panel 26 of the flotation vest 26. In one embodiment, the safety flag mounting base 74 is located adjacent the leading edge 28 of the central panel 26.

In one embodiment, the safety flag 24 desirably includes a flag staff 76 having an upper end 78 and a lower end 80. In one embodiment, a motion activated light 82 is attached to the upper end 78 of the flag staff 76. A flexible flag 84 is attached to the flag staff 76 adjacent the upper end 78 of the flag staff. The flexible flag may be reflective and/or may have reflective lettering mounted thereon. The lower end 80 of the flag staff 76 preferably includes a threaded male connector 86 that is threadable into a female opening provided on the flag staff mounting base 74 for securing the safety flag 24 to the flotation vest 20. In one embodiment, the flag staff 76 has a diameter of between about 1/16" and 1/8". In one embodiment, the flag staff 76 has a length L1 of about 16-36" and more preferably about 24". The flag staff 76 may be made of synthetic materials such as fiberglass.

Referring to FIG. 3A, in one embodiment, the flag staff mounting base 74 preferably includes an internally threaded female opening 88. The flag staff mounting base 74 is desirably attached to the flotation vest 20 and is located adjacent the leading edge 28 of the central panel 26 of the flotation vest 20. As noted above, the lower end 80 of the flag staff 76 of the safety flag preferably includes an externally threaded shaft 86 that screws into the internally threaded female opening 88. FIG. 3B shows the externally threaded shaft 86 (FIG. 3A) screwed in to the internally threaded female opening 88 (FIG. 3A) on the flag staff mounting base 74 for attaching the safety flag 24 to the central panel 26 of the flotation vest 20.

Referring to FIG. 3B, in one embodiment, the light 82 secured to the upper end 78 of the flag staff 76 is a motion-activated LED light having an internal power source such as a battery. In one embodiment, the LED light 82 is activated upon detecting motion, such as movement by a dog wearing the flotation vest. In one embodiment, after motion is detected, the LED light blinks on and off repeatedly to enable rapid and facile location of the light. In one embodiment, the LED light illuminates red light, such as ultra-bright red LED light. The LED light desirably turns off automatically when motion is no longer detected. In one embodiment, the light uses replaceable power sources such as replaceable batteries. In one embodiment, the light is a safety tire strobe light such as that sold by Electrostar, Inc. of Indianapolis, Ind.

Figure 4A:
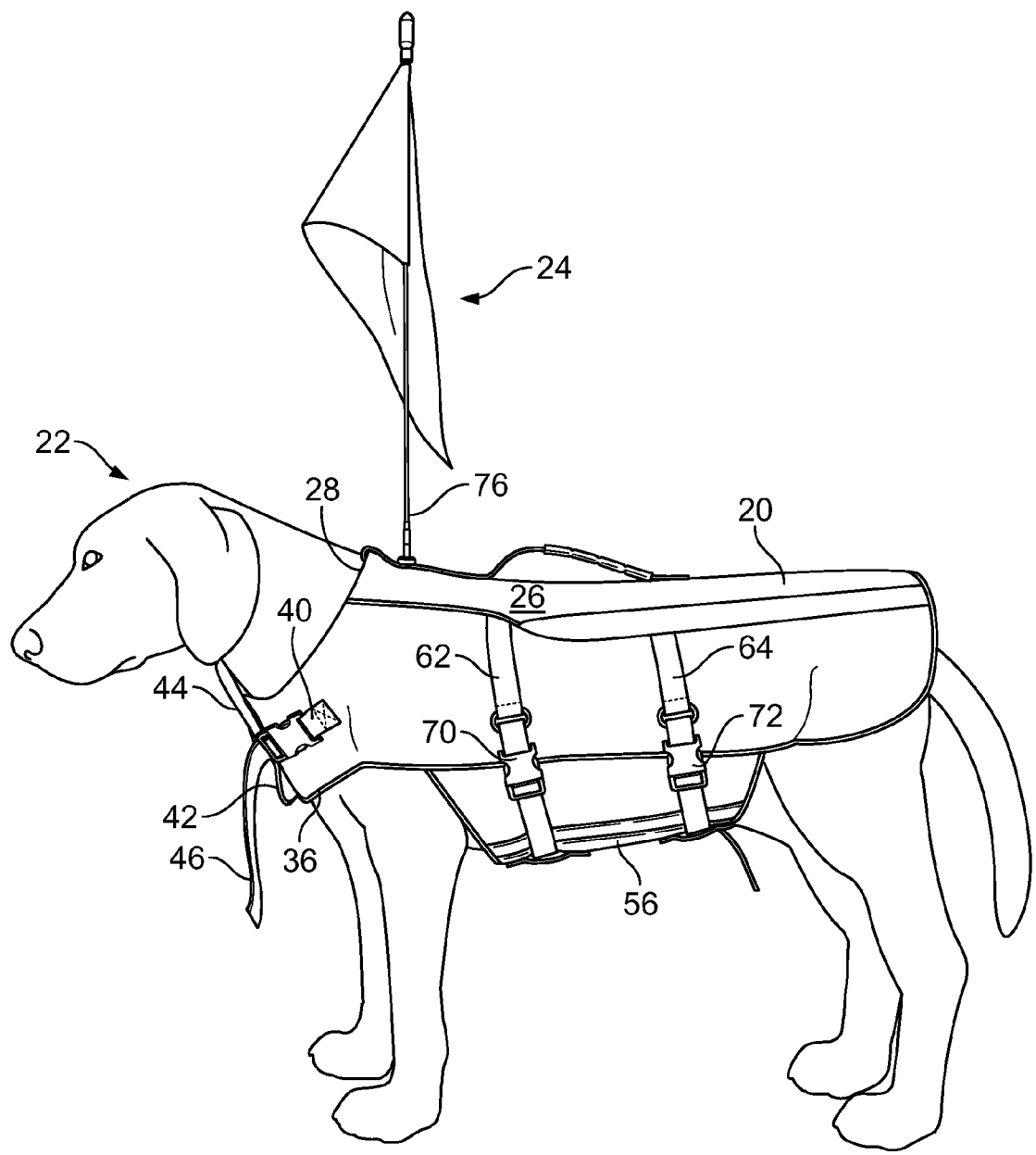
FIGS. 4A-4C shows a side view of a dog flotation vest having a safety flag capable of flexing from a vertical configuration to a horizontal configuration, in accordance with one embodiment of the present invention.

Referring to FIG. 4A, in one embodiment, the flotation vest 20 is secured over a dog 22 so that the central panel 26 of the vest covers the back of the dog, and the first and second laterally extending side panels 56, 60 (FIG. 2) wrap around the belly and the chest of the dog. The front edge 28 of the central panel 26 is preferably positioned over the back of the neck of the dog 22, and the first and second neck wraps 36, 42 are desirably wrapped around the front of the neck of the dog 22. The first and second neck wraps 36, 42 are secured together using the hook and loop fastener material shown and described above in FIG. 2. The buckle 48 (FIG. 2) on the length adjustable strap 46 is inserted into the buckle clasp 40 on the first neck wrap 36. The flotation pad 44 attached to the second neck wrap 42 preferably provides buoyancy at the front of the neck of the dog 22.

After the first and second lateral panels 56, 60 (FIG. 2) have been wrapped around the chest and belly of the dog, the buckles 66, 68 on the laterally extending length-adjustable straps are inserted into the opposing lateral buckle clasps 70, 72. The length of the length-adjustable lateral straps 60, 62 may be adjusted to snuggly fit the flotation vest 20 over the mid-section of the dog 22 (e.g., over the belly and the chest of the dog).

Figure 4B:
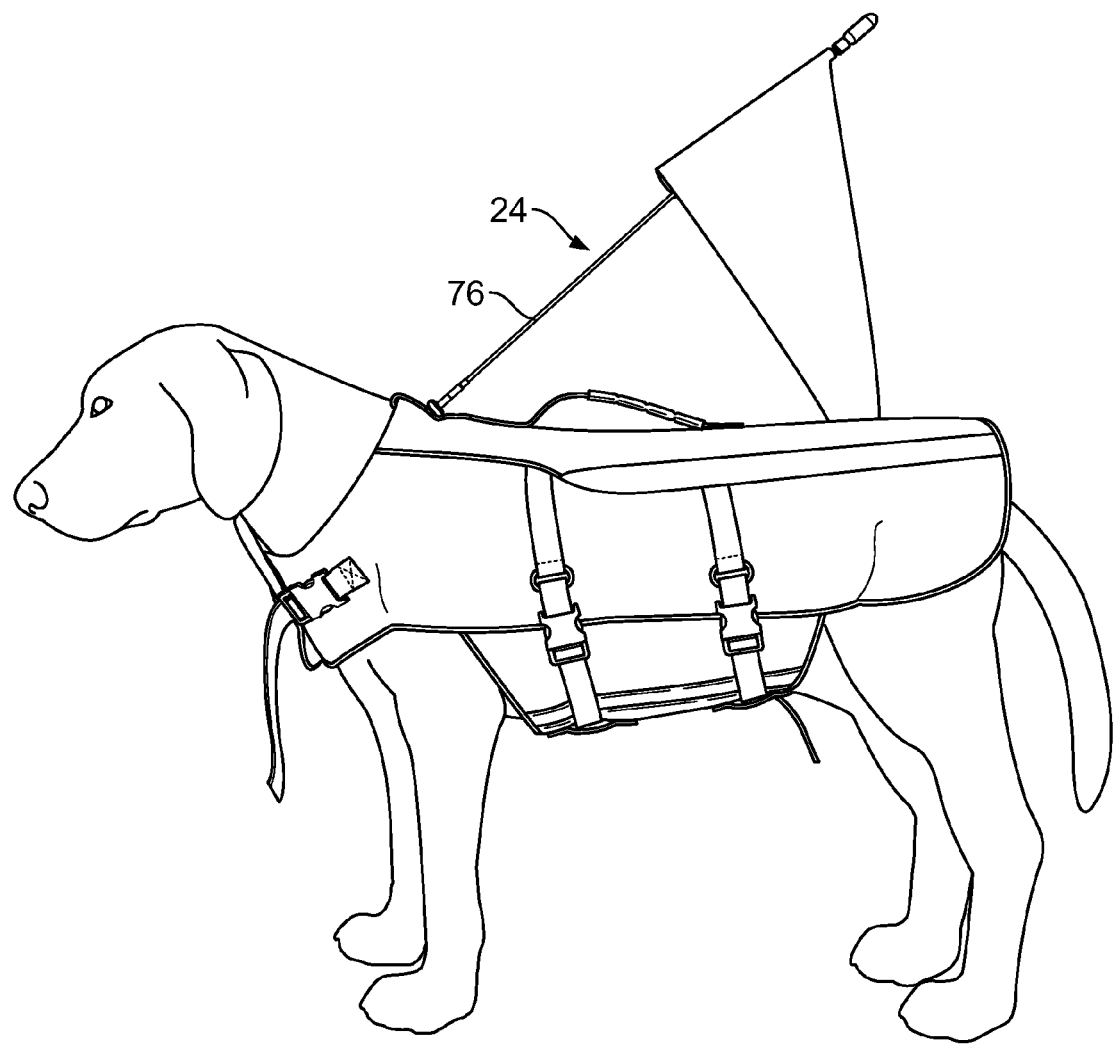
Figure 4C:
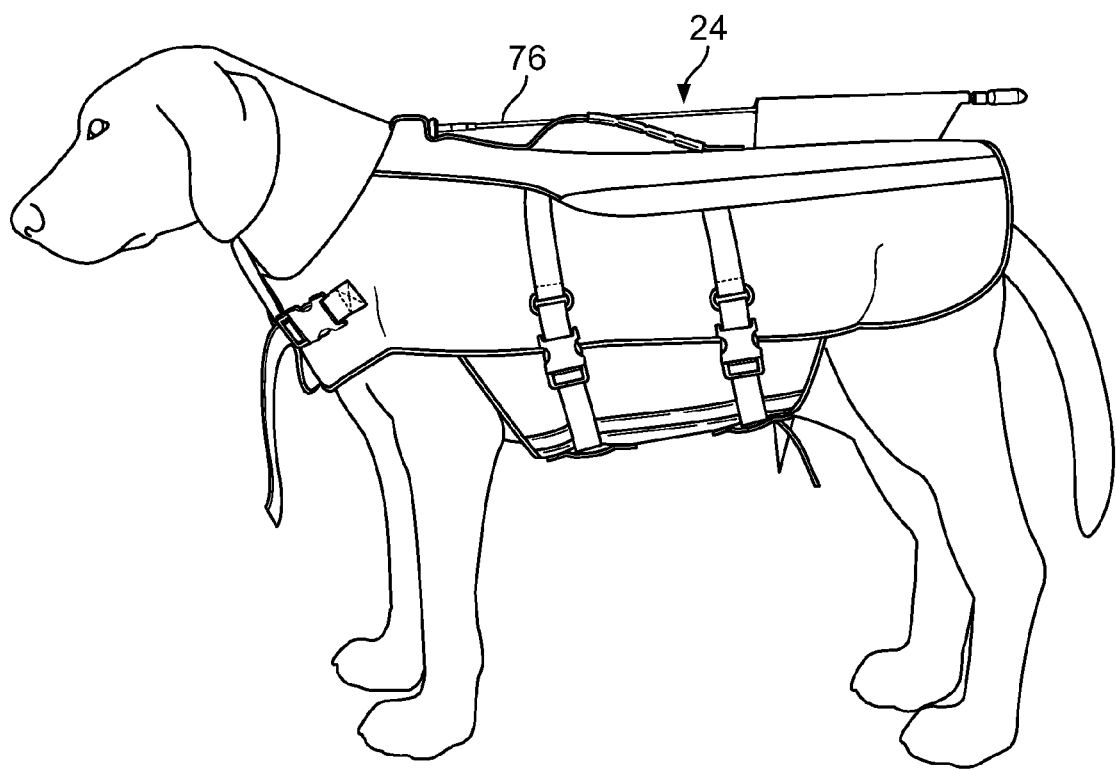

In one embodiment, the safety flag 24 is flexibly mounted to the flotation vest 20 so that the safety flag 24 may move between a vertical orientation and a horizontal orientation. Such flexibility may be required to enable a dog to swim beneath and/or through a fixed obstruction such as the underside of a dock. Without providing a flexible safety flag, a dog wearing the flotation vest disclosed herein may become stuck under a dock or other fixed object, which may be dangerous for the dog. FIG. 4A shows the safety flag 24 in an upright, vertical position. FIG. 4B shows the safety flag 24 as it begins to flex in response to contact by a stationary object such as the underside of a dock. FIG. 4C shows the safety flag 24 after it has flexed to a fully horizontal orientation. In one embodiment, the flag staff 76 may include a flexible material that enables the flag staff to flex. In one embodiment, the flag staff may include one or more springs for enabling the flag staff 76 to flex and bend for enabling the safety flag 24 to move from the substantially vertical orientation (FIG. 4A) to the substantially horizontal configuration (FIG. 4C).

Although the present invention is not limited by any particular theory of operation, it is believed that providing a flexible safety flag will enhance the safety of a dog wearing the flotation vest 20 because the safety flag will not constrain movement of the dog in water, which could occur if the flag staff were rigid.

Figure 5:
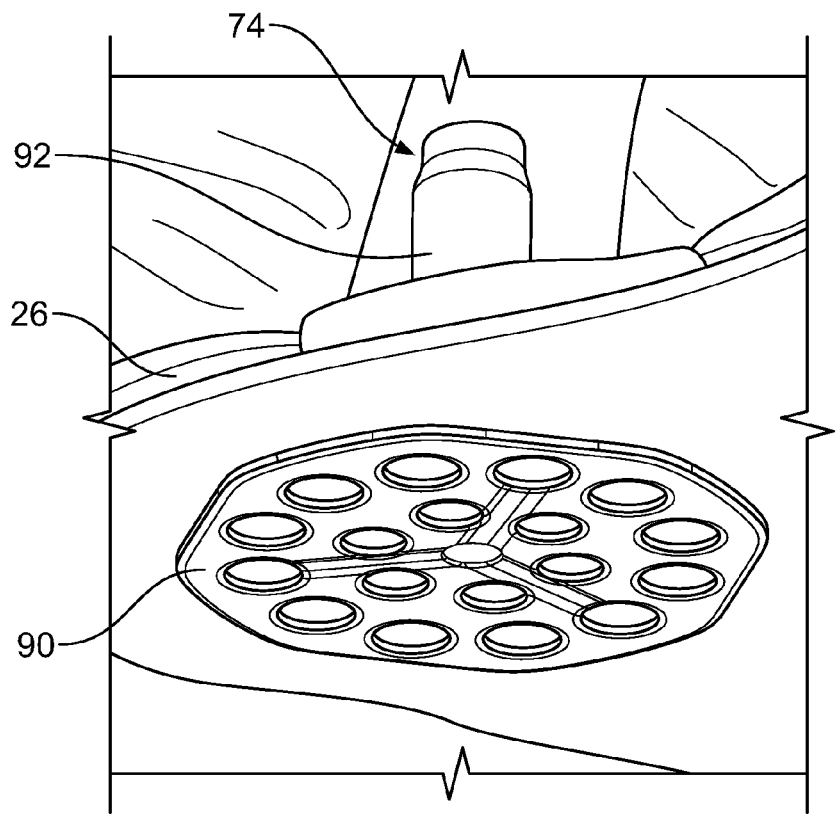
FIGS. 5 and 6 show an underside of a safety flag mounting base including a female threaded collar connected with the dog flotation vest of FIGS. 2 and 3A, in accordance with one embodiment of the present invention.
Figure 6:
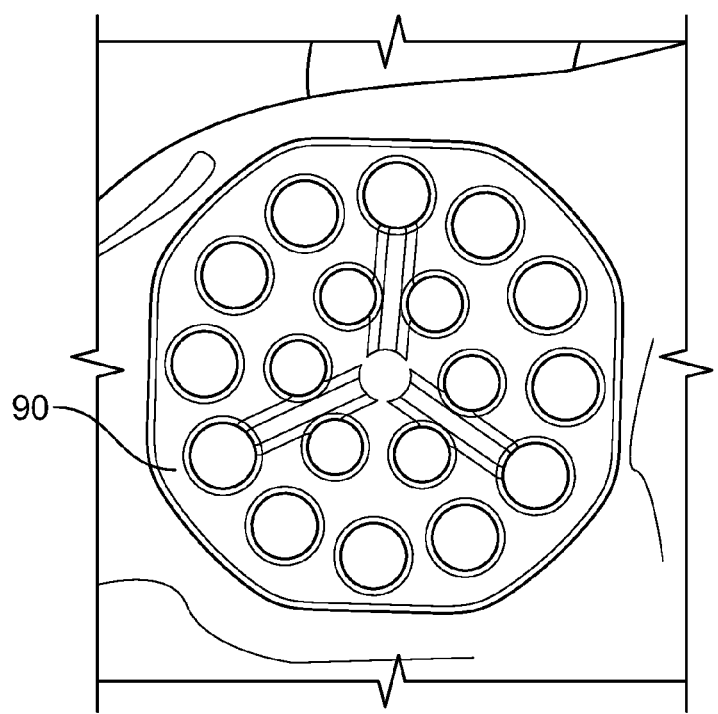

Referring to FIGS. 5 and 6, in one embodiment, the flag staff mounting base 74 desirably includes a female threaded collar such as that sold by Rotaloc International, LLC of Littleton, Colo. The female threaded collar desirably includes a flat base 90 positioned below the central panel 26 and a shaft 92, which extends through the central panel 26 for being accessible at the top side of the central panel 26. The shaft 92 preferably includes the internally threaded female opening 88 shown and described above in FIG. 3A.

Figure 7:
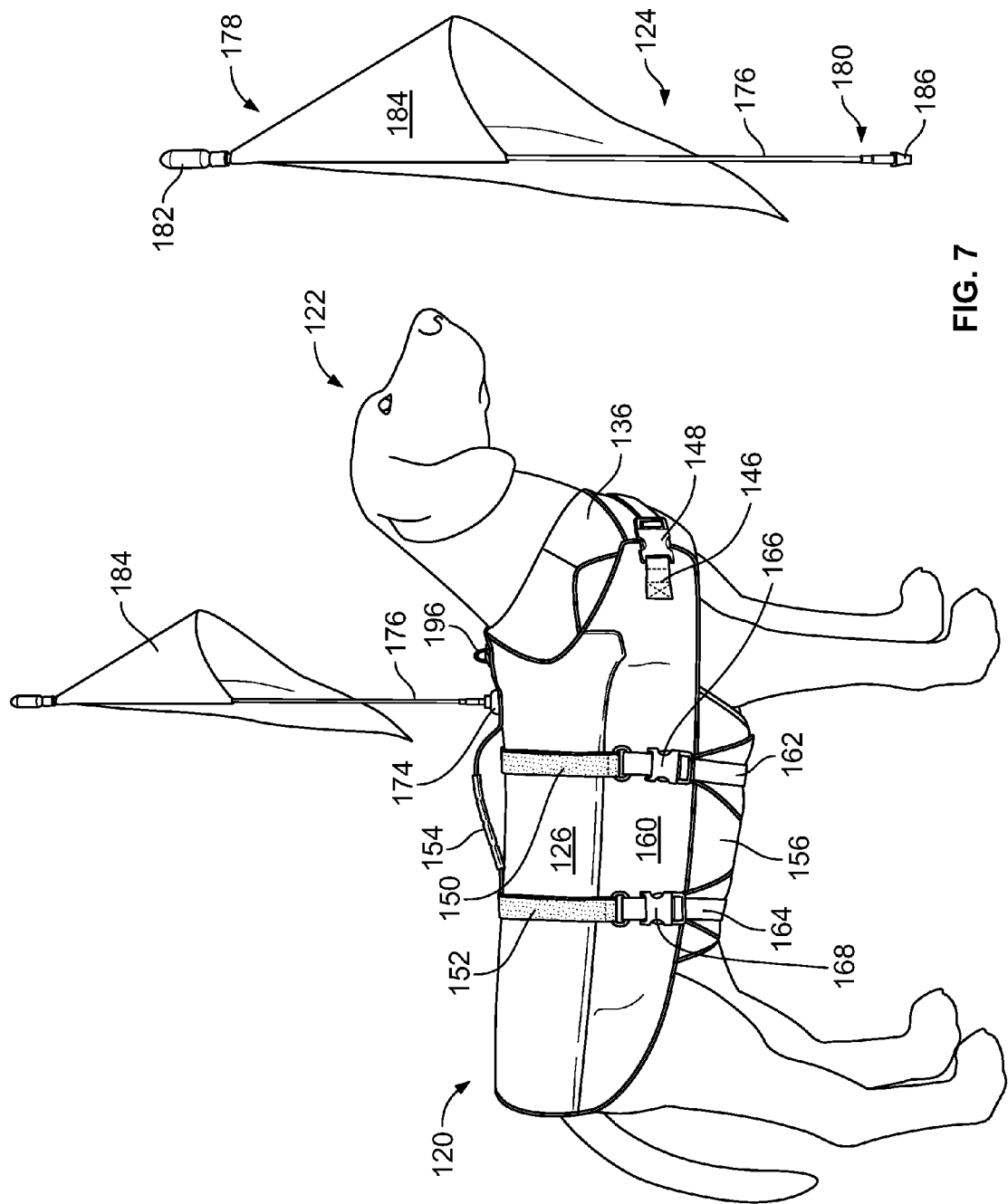
FIG. 7 shows a perspective view of a dog flotation vest having a safety flag, in accordance with another embodiment of the present invention.

Referring to FIG. 7, in one embodiment, a flotation vest 120 for a dog 122 preferably includes a central panel 126 that is positioned over the back of a dog and laterally extending side panels 156, 160 that extend from the sides of the central panel 126 and that are wrapped around the chest and belly of the dog 122. The flotation vest 120 desirably includes reflective strips 150, 152 that are attached to the top side of the central panel 126 to reflect light. The flotation vest 120 desirably includes length adjustable straps 162, 164 and buckles 166, 168 for securing the free ends of the length adjustable straps. The length adjustable straps enable the vest to be placed on dogs having different sizes.

The flotation vest 120 desirably includes a grab handle 154 that is attached (e.g., sewn) to the central panel 126 for enabling a dog to be placed into and/or retrieved from the water. The flotation vest 120 preferably includes a leash ring 196 that is attached to the central panel 126 and that is accessible at a top side of the central panel. The leash ring 196 is used for securing a leash to the central panel 126 of the flotation vest 120.

The leading end of the flotation vest 120 preferably includes first and second neck wrap sections 136, 142 that are wrapped around the front of the neck of the dog 122 and held in place using opposing hook and loop fastener patches. A length adjustable strap 146 having a buckle 148 is used for further securing the first and second neck wraps 136, 142 together.

In one embodiment, the safety vest 120 preferably includes a safety flag 124 having a flag staff 176 with an upper end 178 having a flexible flag 184 secured thereto and a lower end 180 having a plug 186 attached thereto. The flexible flag may be made of a reflective material and/or may have reflective indicia (e.g., letters) secured thereto. In one embodiment, a motion-activated light 182, such as an LED light, is secured to the upper end 178 of the flag staff 176. In one embodiment, the light 182 defines the upper-most end of the safety flag 124. When motion is detected by the light 182, the light preferably blinks on and off so that the location of the safety flag may be quickly determined.

In one embodiment, the central panel 126 of the flotation vest 120 preferably includes a mounting base 174 adapted to receive the plug 186, such as a rubber plug, at the lower end 180 of the flag staff 176. The plug 186 is desirably insertable into the opening of the mounting base 174, as shown in FIG. 7. In one embodiment, after the plug 186 has been inserted into the opening of the mounting base 174, a fastener such as a stainless steel locking clip may hold the plug 186 in place.

In one embodiment, the reflective flag 184 mounted to the upper end 178 of the flag staff 176 may have reflective lettering printed thereon or attached thereto. In one embodiment, the reflective lettering comprises a trade name or trademark for a dog flotation vest having a safety flag.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A dog flotation device with safety flag comprising:

a flotation vest having a central panel adapted to cover the back of a dog; and a safety flag including a flag staff having a lower end connected with said central panel of said flotation vest and an upper end remote from the lower end, said safety flag including a motion-activated light connected to the upper end of said flag staff and a flag attached to said flag staff below said motion-activated light, wherein when said flotation vest is secured over the dog said central panel covers the back of the dog and said flag staff is upright and extends vertically away from said central panel and the back of the dog;

wherein said central panel of said flotation vest comprises a leading edge adapted to conform to the neck of the dog, wherein said flag staff is mounted to said flotation vest adjacent said leading edge of said central panel, a trailing edge remote from said leading edge, and first and second edges that extend between said leading and trailing edges of said central panel;

said flotation vest further comprising a first neck wrap extending forward of said leading edge and said first side edge of said central panel, said first neck wrap containing a first buoyant element, a second neck wrap extending forward of said leading edge and said second side edge of said central panel, said second neck wrap containing a second buoyant element, wherein said first and second neck wraps fold over one another for encircling the neck of the dog, and a neck pad attached to an inner edge of said second neck wrap, said neck pad containing a third buoyant element for providing buoyancy at the front of the neck of the dog.

2. The dog flotation device as claimed in claim 1, further comprising one or more buoyant elements incorporated into said central panel of said flotation vest for providing buoyancy to said dog flotation device.

3. The dog flotation device as claimed in claim 1, wherein said motion-activated light comprises:
   an LED light;
   a power source; and
   a motion detector for detecting movement of said motion-activated light.

4. The dog flotation device as claimed in claim 3, wherein said motion-activated light further comprises a circuit for activating said LED light in response to the detection of motion by said motion detector.

5. The dog flotation device as claimed in claim 4, wherein said LED light blinks on and off when motion is detected by said motion detector.

6. The dog flotation device as claimed in claim 1, further comprising fasteners for holding said first and second neck wraps together around the neck of the dog.

7. The dog flotation device as claimed in claim 1, further comprising:
   a first side flap attached to and extending laterally away from said first side edge of said central panel;
   a second side flap attached to and extending laterally away from said second side edge of said central panel, wherein said first and second side flaps are adapted to wrap around the chest and the belly of the dog for securing said flotation vest to the dog.

8. The dog flotation device as claimed in claim 7, further comprising hook and loop fasteners for securing said first and second side flaps together.

9. The dog flotation device as claimed in claim 8, further comprising length-adjustable straps for securing said flotation vest to the dog.

10. The dog flotation device as claimed in claim 9, wherein said length-adjustable straps have free ends with buckles.

11. The dog flotation device as claimed in claim 1, wherein said flotation vest is selected from the group consisting of vinyl, nylon, plastic, and cotton.

12. The dog flotation device as claimed in claim 1, wherein said flag staff comprises a flexible rod having a diameter of about $1/16"$-$1/8"$ and a length of about 18-30", and wherein said flag staff is adapted to flex between a vertical orientation in which said flag staff is perpendicular to the back of the dog and a horizontal orientation in which said flag staff is parallel to the back of the dog.

13. The dog flotation device as claimed in claim 12, further comprising:
   a flag staff mounting base secured to said central panel of said flotation vest, said flag staff mounting base having an internally threaded female opening accessible at a top side of said central panel;
   the lower end of said flag staff having an externally threaded shaft that screws into said internally threaded female opening of said flag staff mounting base for securing said safety flag to said central panel of said flotation vest.

14. The dog flotation device as claimed in claim 1, further comprising at least one piece of light reflective material attached to said central panel.

15. The dog flotation device as claimed in claim 1, further comprising a grab handle secured to said central panel, wherein said grab handle extends between a leading edge and a trailing edge of said central panel.

16. The dog flotation device as claimed in claim 15, further comprising a leash ring secured to said central panel and being located adjacent the leading edge of said central panel.

17. A dog flotation device with safety flag comprising:
   a flotation vest having one or more buoyant elements;
   said flotation vest having a central panel including a leading edge, a trailing edge, and first and second side edges that extend between the leading and trailing edges;
   a first neck wrap extending forward from said central panel between the leading edge and the first side edge of said central panel, said first neck wrap containing a first buoyant element;
   a second neck wrap extending forward from said central panel between the leading edge and the second side edge of said central panel, said second neck wrap containing a second buoyant element, wherein said first and second neck wraps oppose one another and are adapted to wrap around the neck of a dog for encircling the neck of the dog and holding the leading edge of said central panel against the back of the neck of the dog;
   a neck pad attached to said second neck wrap, said neck pad containing a third buoyant element for providing buoyancy at the front of the neck of the dog;
   a first laterally extending side flap attached to and extending away from the first side edge of said central panel;
   a second laterally extending side flap attached to and extending away from the second side edge of said central panel, wherein said first and second side flaps are adapted to wrap around the chest and the belly of the dog for securing said flotation vest around the mid-section of the dog;
   a safety flag including a flag staff having a lower end connected with said central panel of said flotation vest and an upper end remote from the lower end, said safety flag including a motion-activated LED light connected to the upper end of said flag staff and a reflective flag attached to said flag staff below said motion-activated light, wherein said LED light is adapted to blink on and off when motion of said flag staff is detected, wherein said flotation vest is secured over the dog so that said central panel covers the back of said dog and said flag staff connected with said central panel extends vertically away from said central panel and the back of the dog.

18. The dog flotation device as claimed in claim 17, wherein said flag staff is flexible for moving between a vertical orientation in which said flag staff extends vertically away from a top major surface of said central panel and the back of the dog and a horizontal orientation in response to external forces exerted upon said flag staff in which said flag staff extends parallel to the top major surface of said central panel and the back of the dog, and wherein said flag staff is normally in the vertical orientation, said device further comprising:
   hook and loop fasteners provided on said side flaps and neck wraps; and
   length-adjustable straps adapted to wrap around the dog for securing said flotation vest to the dog.

19. The dog flotation device as claimed in claim 1, wherein said neck pad has a long side that is attached to the inner edge of said second neck wrap, and wherein said third buoyant element in said neck pad is not said second buoyant element in said second neck wrap.

20. The dog flotation device as claimed in claim 17, wherein said neck pad has a long side edge that is attached to the inner edge of said second neck wrap, and wherein the long side edge of said neck pad and the inner edge of said second neck wrap extend between said second buoyant element of said second neck warp and said third buoyant element of said neck pad.

* * * * *